US012725186B2

(12) United States Patent
Bastide et al.

(10) Patent No.: US 12,725,186 B2
(45) Date of Patent: Sep. 1, 2026

(54) COMPUTER-BASED IDENTIFICATION AND PRESENTATION OF VIRTUAL WORLD ADVERTISEMENTS

(71) Applicant: International Business Machines Corporation, Armonk, NY (US)

(72) Inventors: Paul R. Bastide, Ashland, MA (US); Robert E. Loredo, North Miami Beach, FL (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 18/183,558

(22) Filed: Mar. 14, 2023

(65) Prior Publication Data

US 2024/0311876 A1 Sep. 19, 2024

(51) Int. Cl.

| | |
|---|---|
| ***G06Q 30/00*** | (2023.01) |
| ***G06F 3/04815*** | (2022.01) |
| ***G06Q 30/0241*** | (2023.01) |
| ***G06Q 30/0251*** | (2023.01) |

(52) U.S. Cl.

CPC ..... *G06Q 30/0277* (2013.01); *G06F 3/04815* (2013.01); *G06Q 30/0252* (2013.01)

(58) Field of Classification Search

CPC ............ G06Q 30/0277; G06Q 30/0252; G06F 3/04815

See application file for complete search history.

(56) References Cited

U.S. PATENT DOCUMENTS

| | | | |
|---|---|---|---|
| 8,441,475 B2 | 5/2013 | Hamilton, II | |
| 9,338,200 B2 | 5/2016 | Park | |
| 10,133,733 B2 | 11/2018 | Nathan | |
| 10,332,159 B2 * | 6/2019 | Han | G06Q 30/0277 |
| 10,424,101 B2 | 9/2019 | Castelli | |

(Continued)

FOREIGN PATENT DOCUMENTS

| | | |
|---|---|---|
| EP | 3983969 A1 | 4/2022 |
| WO | 2012129663 A1 | 10/2012 |
| WO | 2020229841 A1 | 11/2020 |

OTHER PUBLICATIONS

"Create Amazing Thinks" metaverse, retrieved Jan. 17, 2023, 4 pgs. https://studio.gometa.io/landing.

(Continued)

*Primary Examiner* — Meredith A Long

(74) *Attorney, Agent, or Firm* — Joseph P. Curcuru

(57) ABSTRACT

In an approach to improve enhancing advertising effectiveness in a virtual environment, embodiments identify placement context for an identified advertisement in a predetermined area in a virtual world based on received advertisements, visual data from a user, identified contextual data, and the identified objects in the predetermined area. Further, embodiments associate the advertisement and the placement context with a priming event or an object, wherein the object is an object associated with the advertisement, and select, for the user in the virtual world, a timing and position of the priming event or the object in a presentation window. Additionally, embodiments present, by a client computer through a user interface, the priming event or the object when the user is within the presentation window.

20 Claims, 5 Drawing Sheets

(56) References Cited

U.S. PATENT DOCUMENTS

| | | | | |
|---|---|---|---|---|
| 10,699,282 | B2 | 6/2020 | Hamilton, II | |
| 10,740,804 | B2 | 8/2020 | Spivack | |
| 11,235,530 | B2 | 2/2022 | Kaltenbach | |
| 11,657,850 | B2 * | 5/2023 | Ahmed | G06V 20/64 386/278 |
| 2004/0248649 | A1 * | 12/2004 | Arai | A63F 13/45 463/32 |
| 2008/0263459 | A1 * | 10/2008 | Altberg | H04L 51/046 715/757 |
| 2009/0254824 | A1 | 10/2009 | Singh | |
| 2014/0335953 | A1 * | 11/2014 | Marsland | A63F 13/533 463/31 |

OTHER PUBLICATIONS

Create Full-Body 3D Avatar from a Photo|Ready Player Me, retrieved Jan. 2, 170217, https://readyplayer.me/avatar.

"GoMeta / animation-packager" Packaged 3D assets for use in Metaberse, GitHub, retrieved Jan. 17, 2023, 5 pgs. https://github.com/GoMeta/animation-packager.

"Meta Quest for Developers" Meta Products, Developer Tools|Meta for Developers, retrieved Oct. 27, 2022, 5 pgs. https://developers.facebook.com/products/#filter-id=ar-vr.

"Priming (psychology)," Wikipedia, retrieved Jan. 17, 2023, 16 pgs. https://en.wikipedia.org/wiki/Priming_(psychology).

Barney, J., "Priming in Marketing: An Advertising Psychology Tactic," Einstein Marketer, retrieved Jan. 27, 2023, 11 pgs. https://www.einsteinmarketer.com/priming-in-marketing/.

Breia, R., "How to Enter the Metaverse—A Step-by-Step Guide," Sensorium Blog, Nov. 30, 2021, 12 pgs. https://sensoriumxr.com/articles/how-to-enter-the-metaverse.

Caulfield, B., "What Is the Metaverse?" NVIDIA Blog, Aug. 10, 2021, 18 pgs. https://blogs.nvidia.com/blog/2021/08/10/what-is-the-metaverse/.

Rosenberg, L., "Marketing in the Metaverse: A Fundamental Shift," Future of Marketing Magazine, Future of Marketing Institute, Aug. 15, 2022, 7 pgs. DOI: 10.13140/RG.2.2.35340.80003.

Vircadia|Open Source Metaverse Platform, retrieved Jan. 17, 2023, https://vircadia.com/#community https://github.com/vircadia/vircadia-unity-sdk https://docs.vircadia.com/create/wearables.html https://apidocs.vircadia.dev/.

Axworthy, J., Advertising in the Metaverse: 'Enhance Interactions, Don't Interrupt Them', https://www.raconteur.net/technology/advertising-in-the-metaverse, Apr. 28, 2022, 7 pages.

* cited by examiner

| ADVERTISEMENT | | | SEMANTIC CONTEXT | | |
|---|---|---|---|---|---|
| NAME | ASSOCIATION | → | NAME | ASSOCIATION | TYPE |
| AD1 | BANANA | | BANANA | FRUIT | OBJECT |
| AD2 | APPLE | | FRUIT | FRUIT TREE | OBJECT |
| AD3 | FRUITJAM | → | REVIVAL | MUSIC | EVENT |

FIG. 3

COMPUTER-BASED IDENTIFICATION AND PRESENTATION OF VIRTUAL WORLD ADVERTISEMENTS

BACKGROUND OF THE INVENTION

The present invention relates generally to virtual reality, and more particularly to the field of improving the generation and display of virtual based advertisements.

The metaverse, or more generally known as the virtual world, is an immersive digital experience where users interact with others in real-time. These interactions engage the users in many modalities—sight, sound, movement, time, smell, sound, and are interoperable across applications and domains. These new interactions modalities lead to new problems and are not conducive to attentive collaboration. Broadly speaking, the technologies companies refer to when they talk about "the metaverse" can include virtual reality (VR)—characterized by persistent virtual worlds that continue to exist even when you're not playing—as well as augmented reality (AR) that combines aspects of the digital and physical worlds. However, the term "metaverse" (i.e., virtual world) does not require that virtual spaces be exclusively accessed via VR or AR. Virtual worlds can be accessed through personal computers (PCs), game consoles, and even smartphones.

SUMMARY

Embodiments of the present invention disclose a computer-implemented method, for enhancing advertising effectiveness in a virtual environment, the computer-implemented method comprising: identifying placement context for an identified advertisement in a predetermined area in a virtual world based on received advertisements, visual data from a user, identified contextual data, and/or the identified objects in the predetermined area; associating the advertisement and the placement context with a priming event or an object, wherein the object is an object associated with the advertisement; selecting, for the user in the virtual world, a timing and position of the priming event or the object in a presentation window; and presenting, by a client computer through a user interface, the priming event or the object when the user is within the presentation window.

BRIEF DESCRIPTION OF THE DRAWINGS

FIG. 3 illustrates one example, in accordance with an embodiment of the present invention;

DETAILED DESCRIPTION

Figure 1:
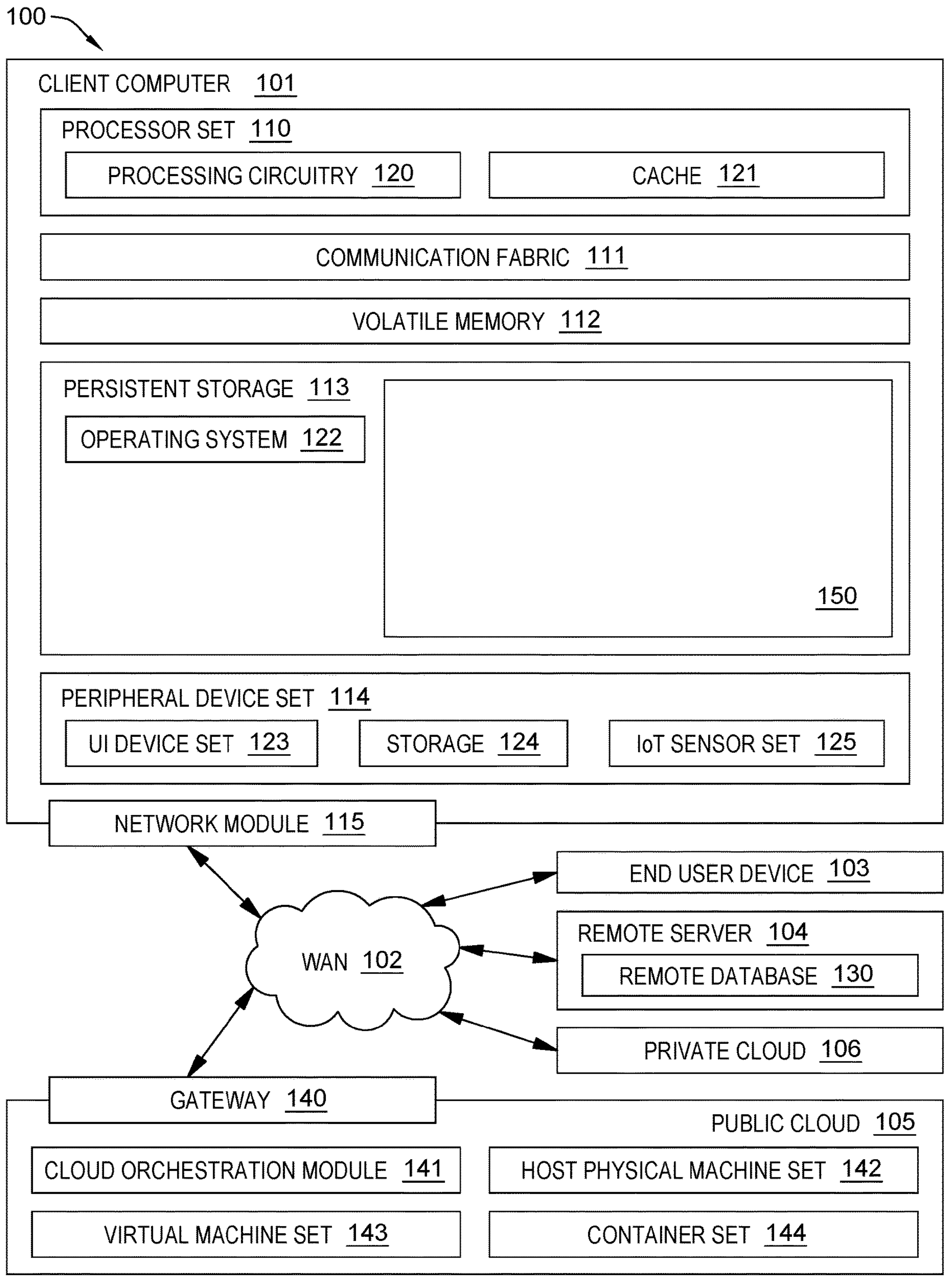
FIG. 1 is a functional block diagram illustrating a distributed data processing environment, a program, in accordance with an embodiment of the present invention.

Embodiments of the present invention recognize that some modern advertisements establish a contextual relationship between the content displayed on a computing device (e.g., smartphone, virtual reality headset, laptop, etc.) and relevant context being displayed to place optimal advertisements. Embodiments of the present invention recognize that many vendors use a combination of keywords and cookies to auction advertisement place on a computing device. For example, a first advertiser, referred to as "AD1", wants to sell widgets. In this example, a user searches for "widgets," wherein an application and/or search engine identifies the keyword "widget" and associates the keyword with AD1 and displays the advertisement for widgets sold by AD1 to the user. Alternatively, embodiments of the present invention recognize that advertisements (ads) are presented blindly, based on the crowd priority, or based on sentiment. Embodiments of the present inventions recognize that a virtual world federates the physical and digital world advertising practices via product placement based on contexts and the concept of billboards.

Embodiments of the present invention recognize that there is an opportunity to improve upon current advertising techniques. Embodiments improve the art and solve at least the problems stated above by implementing and executing a priming effect on a user, wherein, in various embodiments, the priming affect occurs when one or more stimuli influences a response to a subsequent stimulus, and wherein the influence is generally immediate and wanes as time and distance pass. More specifically, embodiments of the present disclosure improve the art and solve at least the problems stated above by, at least, (i) identifying an advertisement and placement context in a virtual environment (e.g., four-dimensional, three-dimensional and/or two-dimensional virtual reality (VR) environment, augmented reality (AR) environment, and/or mixed reality environment), (ii) associating the advertisement and placement context with a priming event, object, or objective, (iii) evaluating, for a user, the timing and position of a priming event or object in a presentation window, and (iv) presenting, when the user is within a presentation window, the priming event, object or objective. Additionally, embodiments of the present disclosure improve the art and solve at least the problems stated above by removing the presented priming object upon a transition/focus on the advertising object, and limits the volume taken by the priming object based on the revenue/value paid for the advertisement. It is important to note that the terms and/or phrases "virtual world" and "virtual environment" are synonymous and cover both virtual world and virtual environment as they are known and understood in the art.

Implementation of embodiments of the invention may take a variety of forms, and exemplary implementation details are discussed subsequently with reference to the Figures (i.e., FIG. 1-FIG. 5).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, a virtual reality headset, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In various embodiments component 150 enhances advertising effectiveness in a virtual world/virtual environment by (i) identifying an advertisement and placement context of the advertisement to be displayed via client computer 101 (e.g., virtual headset (VR) or device with the ability to display augmented reality (AR), (ii) associating the advertisement and placement context with a priming event, object, or objective, evaluating, for a user, the timing and position of a priming event or object in a presentation window, and presenting, when the user is within a presentation window, the priming event, object, and/or objective via UI device set 123. Component 150 may remove a presented priming object upon a transition of focus by the user to the advertising object, and limits the volume (the amount of space and repetition) taken by the priming object based on the revenue/value paid for the advertisement.

In various embodiments, component 150 operates utilizing geographic specific locations by adding priming advertisements in a virtual world only within specific predefined, predetermined, and/or identified locations or geographic fences for a specific cohort (e.g., target audience/specific users), wherein the cohort may need to be in the same location and active at the same time. Component 150 may implement and/or execute priming objects to a user specific rendering, wherein if the rendering conflicts then the component 150 may dynamically adjust the rendering to fit the display of the priming object within the visual virtual display/environment the user is in or identify a secondary location to display the priming object in the virtual environment. Component 150 may present an advertisement based on a cohort that maximizes revenue before selecting a priming object. Component 150 may records statistics on the precision of the priming event, object, or objective to establish a presentation window (window). Further, component 150 may label with identify objects with a tag or indicator so the object is clearly part of a multi-staged advertisement. For example, displaying the object with a digital watermark or label that indicates to a user that the object is associated with an advertisement. Additionally, component 150 may utilize the trajectory and location of the visual focus of a user to prime for an anticipated group context or event for a group independent of initial visual locations but rather for the intents of the user (e.g., teleporting to the next location or a meeting from a calendar feed). In various embodiment, component 150 anticipates and predicts the context, event, and/or location of a target user based on the trajectory and location of the visual focus and an identified intent of the user.

For example, Advertiser 1 (AD1) wants to sell a widget. In this example, AD1 creates the widget in a virtual world studio (i.e., a tool for creating virtual world (e.g., VR and/or AR) experiences), wherein component 150 receives, from AD1, a time range of 8:30 AM to 5:00 PM to align with store hours in addition to the widget, widget pieces, large, and discount as the labels and context respectively. In this example, component 150 receives a trigger fence to a predetermined virtual space (e.g., virtual coffee house). Further, in this example, component 150 receives a registered advertisement and placement context associated with a selected or identified location in a virtual world. Component 150 may utilize the identified/received advertisement and placement context to analyzed for correlated contexts. Continuing the widget example, analyzing the surrounding area of a user and identifying areas to display the widget (e.g., desk, counter, table, store front window, etc.). In another example, if the advertisement is for apples then component 150 would identify trees to display the advertisement for apples (e.g., apple trees) by creating the contextual connection and utilizing semantic relationships between apples and trees and the surrounding virtual environment of the user. Thus, component 150 associates the identified/received advertisement and placement context with semantically similar content.

In various embodiments, component 150 records the semantic relationships and associate contexts and begins monitoring the users within a virtual world for predetermined triggers. Component 150 may monitor the text (e.g., virtual chats), video (e.g., displayed objects in a surround the area), conversations via a microphone and/or haptic sensors (e.g., physical movements and/or gestures), and the x-y-z location of the surrounding area of a user. In various embodiments, component 150 receives instructions to activate and/or proactively activates text monitoring, wherein text monitoring is utilized to identify contextual associations and the timing and positioning of a priming event. For example, a user types "is there any fruit?", wherein component analyzes the entered text form the user to determine a contextual association from fruit to apple from AD1. Further, component 150 may evaluate the timing and position of a priming event (e.g. apple tree). Continuing the apple example, component 150 evaluates the surroundings of a user and predicts and/or identifies the timing and positioning of a fruit tree based on the surrounding area, objects in the surrounding area, the visual focus of the user, and/or the predicted surrounding area and/or predicted visual focus of the user. In this example, responsive to the user being in a presentation window, priming event, object, and/or objective, component 150 generates and displays the apple advertisement (i.e., an apple) to the user.

In various embodiments, component 150 enhances advertising effectiveness in a virtual environment through product placement based on contexts and correlating degree of focus on object data so that component 150 provides multiple varying collections of data objects. Component 150 may identify, in a virtual environment facilitated by client computer 101 and UI device set 123, an advertisement and a placement context of the advertisement, associate the advertisement and the placement context with a priming event or object, select, for a user in the virtual environment, a timing and position of the priming event or object in a presentation window, and present, when the user is within the presentation window, the priming event or object in the virtual environment through the necessary AR and/or VR hardware.

Figure 2:
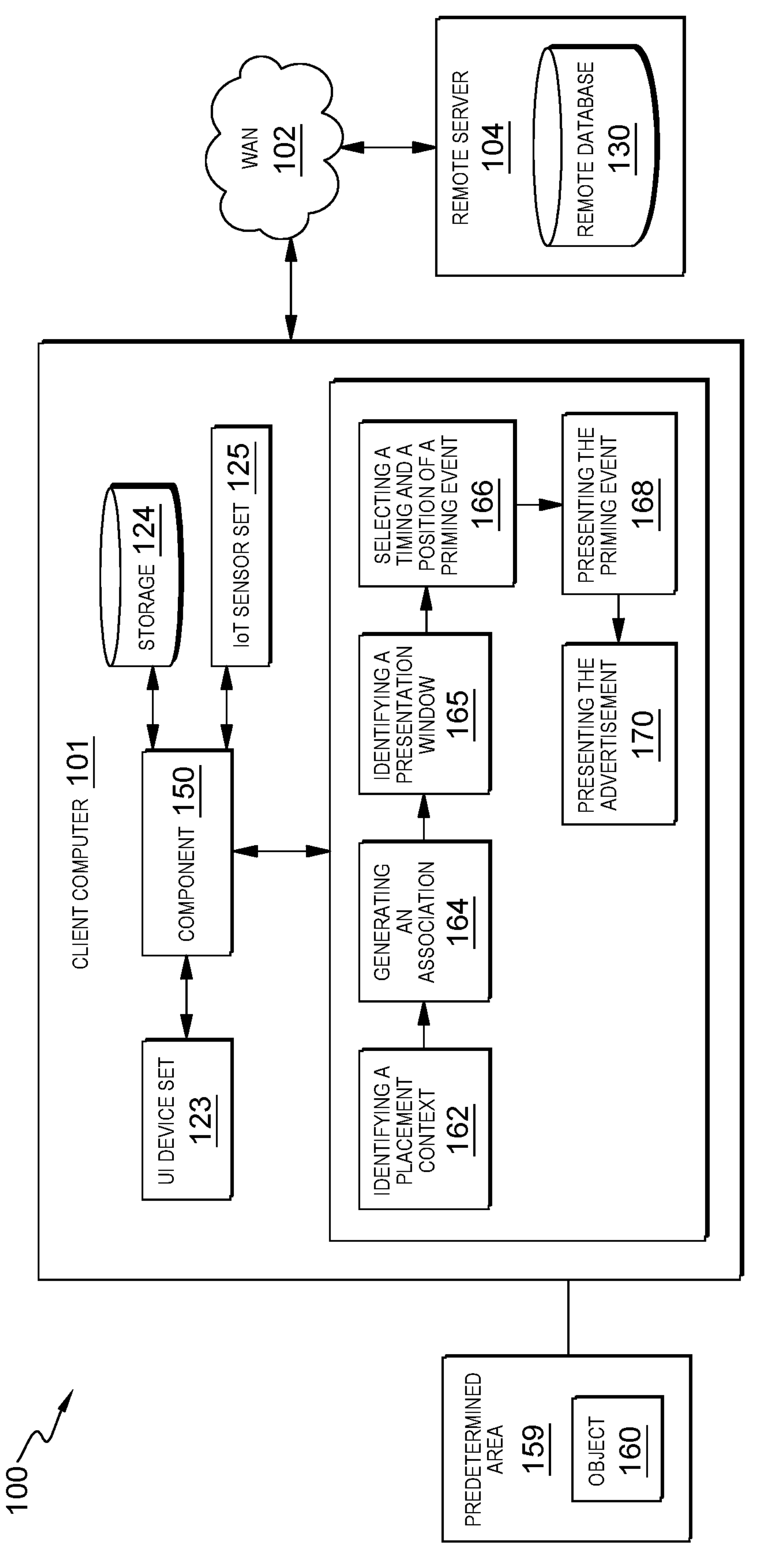
FIG. 2 illustrates a functional block diagram and operational steps of the program, on a server computer within the distributed data processing environment of FIGS. 1, in accordance with an embodiment of the present invention.
Figure 4:
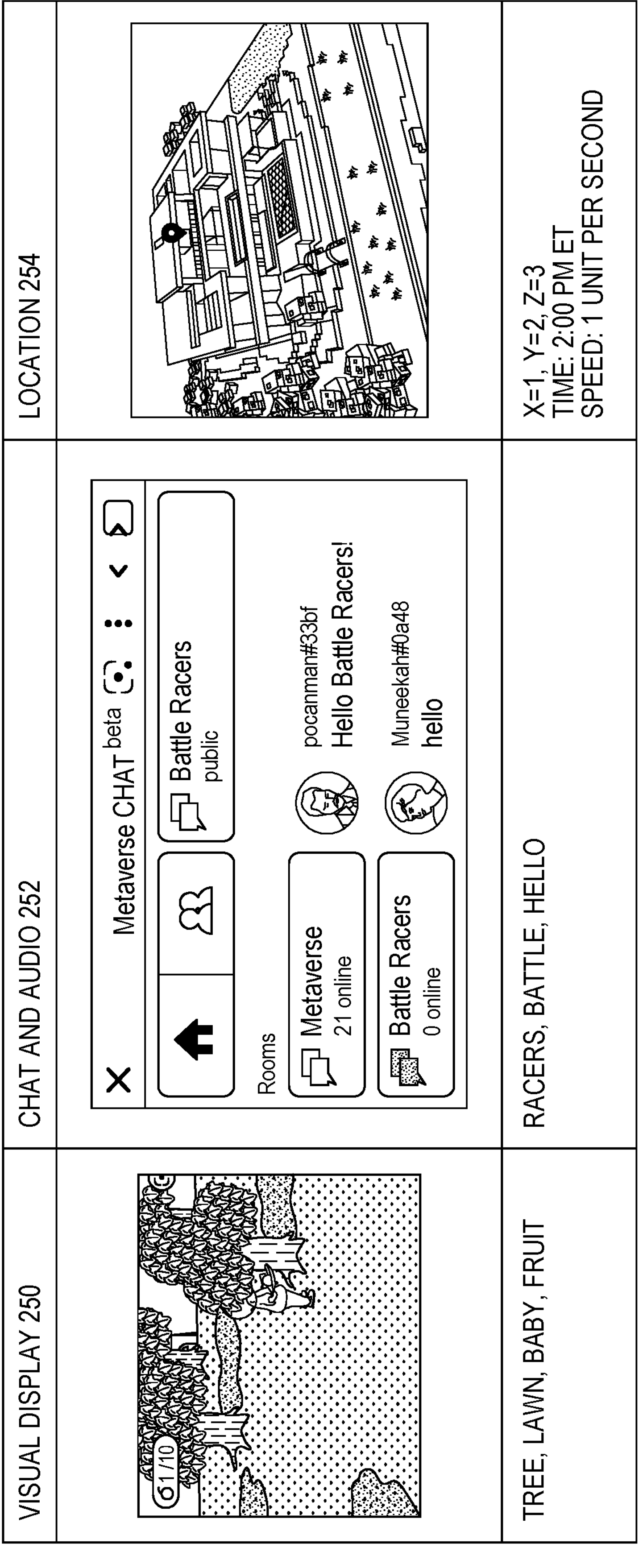
FIG. 4 illustrates one example, in accordance with an embodiment of the present invention.

FIG. 2 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes predetermined area 159, client computer 101, and remote server 104 interconnected via WAN 102.

In the depicted embodiment, component 150 identifies a placement context 162 in predetermined area 159, wherein predetermined area 159 is a predetermined area in a virtual world/environment that is associated with the location and/or actions of a user in the virtual world/environment. In various embodiments, component 150 identifies a placement context 162 and advertisement in predetermined area 159. Component 150 may receive and/or generate an advertisement and label the advertisement and one or more associated objects (object 160, hereinafter referred to object(s) 160) with contextual data associated with the advertisement and/or product and/or service being advertised, wherein object(s) 160 are objects in a virtual environment, including AR and mixed reality, that fit within received or predetermined semantic context for an advertisement and/or a or product and/or service being advertised. An example of advertisement and semantic context labeling are illustrated FIG. 5.

In various embodiments, advertisement and semantic context labeling data is stored in a relational table (e.g., FIG. 3) that models a Key-Value-AD table such that association can be resolved quickly using Graph Traversals (e.g., Janus Graph). The semantic context may include a hint on the size, distance away. The data associated with the advertisement and semantic context labeling may be based on real world sizes (physical real world dimensions of an object, item, and/or topic of interest). The advertisement and semantic context labeling data may be utilized by component 150 to identify placement context 162. In various embodiments, the table may be enhanced with geospatial relational tables to aid in the search and enrich the relationships/contexts that are derived. In various embodiments, component 150 may store data related to an advertisement, semantic context labeling, geospatial relational tables, Key-Value-AD tables, a user, object(s) 160, and/or predetermined area 159 to remote database 130. In some embodiments, component 150 stores any data associated with embodiments and/or steps performed to remote database 130.

In various embodiments, component 150 generates an association 164 between the advertisement and placement context through a priming event, object(s) 160, and/or objective. In various embodiments, utilizing the data in remote database 130, component 150 associates the data with the semantic context and the priming object, priming event, and/or objective. For example, using FIG. 3 to illustrate the association, component 150 selects AD1 and finds banana as part of the context, wherein the context includes a Fruit association with Tree. In this example, Component 150 retrieves the Fruit association and finds Fruit Tree. In some embodiments, the retrieval may be an optimized graph traversal finding the most likely or highest weighted attribute/value first, wherein the highest weighted attribute/value first are predetermined.

In the depicted embodiment, component 150 identifies a presentation window 165. Component 150 may evaluate and identify, for a user, the timing and position of a priming event or object in a presentation window. Component 150 may hook into the user's current location and conversation and analyzes and stores the images, snapshots of the video to help aid in determining a direction of the user, and objects (i.e., objects 160) in view and the intent of objects 160 within predetermined area 159. For example, using FIG. 4 to describe an embodiment, component 150 retrieves the image being displayed to the user (i.e., visual display 250), the chat and audio experienced and generated by the user while engaging and/or interacting in the virtual environment (chat and audio 252), and the location of the user in the virtual environment (location 254) and analyzes the retrieved data to identify the timing and position of a priming event or object in a presentation window. In this example, component 150 identifies tree, lawn, field, and fruit in visual display 250 based on an image analysis of the received visual display 250. Further, in this example, component 150 extracts and analyzes chat and audio 252 through natural language processing (NLP) techniques to identify racers, competition, and greetings within the received data. Additionally, in this example, component 150 analyzes location 254 to identify coordinates X=1, Y=2, Z=3 of the user at Time: 2:00 PM ET, and that the speed of the user is 1 unit per second.

To further aid in the evaluation, component 150 may record a base set of interests for the user. Component 150 may learn the interests/preferences of a user, through reinforcement (sourced question/answer sessions with the user or monitoring of the user's engaged/expressed interests through client computer 101 (e.g., personal computer, VR headset, AR hardware, etc.)). Utilizing the learned and/or received preferences, component 150 may build a sophisticated like/dislike or probabilistic interest data set. In various embodiments, component 150 limits the interests based on expertise or expressed interest levels based on received data from a user, industry standards, regional and local municipality laws and standards, and/or an advertiser.

In the depicted embodiment, component 150 selects a timing and a position of a priming event 166 based on an identified presentation window 165. Component 150 may select a timing and position of a priming event, object or objective based on the user's current location and conversation and analyzes and stores the images, snapshots of the video to help aid in determining a direction of the user, and objects (i.e., objects 160) in view and the intent of objects 160 within predetermined area 159.

In the depicted embodiment, component 150 presents the priming event 168 when the user is within the identified presentation window 165. Component 150 may present the priming event 168 when the user is within the identified presentation window 165, the priming event, object or objective. Component 150 may generate and output the priming object to the identified presentation window 165 using a hook or any other form of system integration known and understood in the art. Object(s) 160 may be teleported to a location for a set period. Component 150 could also apply blurring or reduce the processing power to fully render the video and audio to present streams outside of the subset. In the depicted embodiment, component 150 presents the advertisement 170 within the identified presentation window 165.

In alternative embodiments, component 150 may be used in future contexts. For example, a user is prepping for a race this weekend, the advertisement could include content that the user would likely need or use in a race (e.g., new shoes, bike pre-race service, etc.). However, in this example, if the weather is expected to be a factor, component 150 includes the sound of the rain and the enhance the sound of the wind to mimic that of 5 vs 20 mph winds. This enhanced sound of the relevant weather pattern would direct the user to focus on bike resistant training services and/or products over swim services or products because bike time is affected more by winds than swim time. Component 150 may also consider chains and repetitions of priming objects.

In various embodiments, component 150 mixes a custom experience for a user (e.g., viewer) to refocus the user's attention. Component 150 may use a multiple state avatar to replace an existing input and focus a user's attention. Component 150 suggests to focus on an activity based on the degree of the user's multisensory focus on the activity, wherein the suggestion comprises visual suggestions (e.g., predetermined visual prompts and/or illuminated visual cues), physical suggestion (e.g., vibrating or resistance), or textual prompts that direct a users focus to a desired area. Additionally, component 150 may select multiple user feeds that correspond to the degree where sharing focus of multiple senses does not impede the level of understanding of the context. Further, component 150 may correlate the degree of focus on the object data so that it can provide multiple varying collection of data objects presented to specific sensory receptors (i.e., visual or audible) and not necessarily all at once. Furthermore, component 150 relates the object to the intent or objective of the user.

Figure 5:
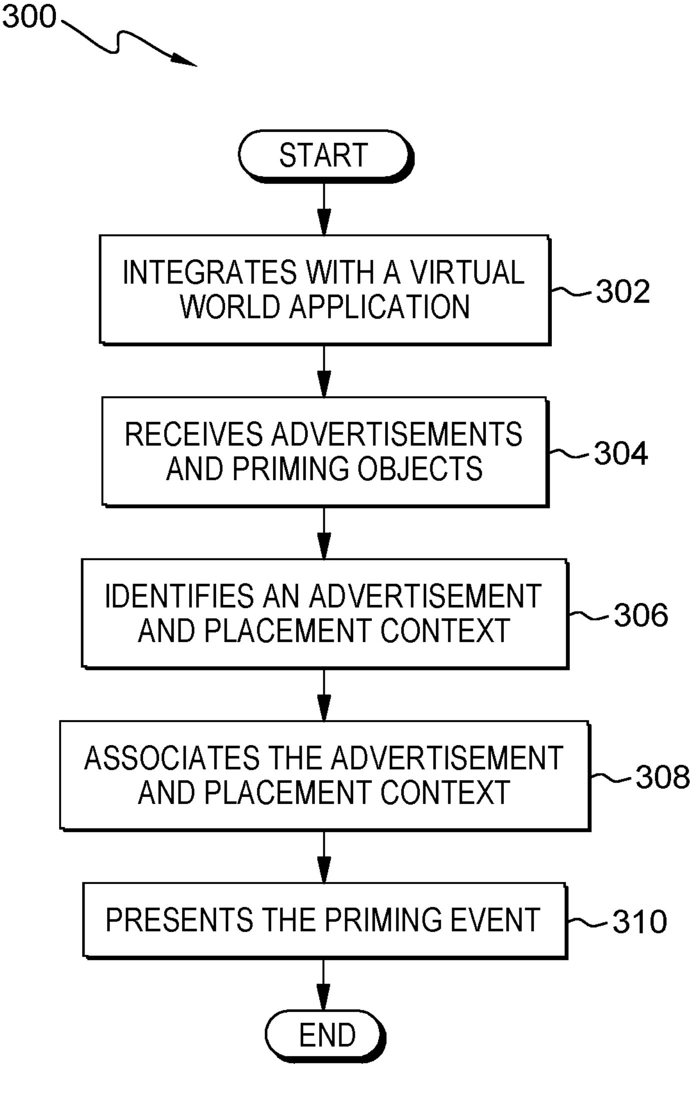
FIG. 5 illustrates operational steps of the program, on a server computer within the distributed data processing environment of FIGS. 1, for enhancing advertising effectiveness in a virtual environment in accordance with an embodiment of the present invention.

FIG. 5 illustrates operational steps of component 150, generally designated 200, in communication with client computer 101, remote server 104, private cloud 106, EUD 103, and/or public cloud 105, within distributed data processing environment 100, for enhancing advertising effectiveness in a virtual or mixed reality environment, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 150 integrates with a virtual world application or platform. In various embodiments, component 150 integrates with a virtual world application or platform. The integration may be via a hook into the rendering engine, an overlay in a separate device, or a plugin to the viewer component. If the hook is in a plugin or a separate device, component 150 relies on Computer Vision to track, label and associate movement with a labeled input, such that decisions can be made on the interpolated context.

In step 304, component 150 receives an advertisement and priming objects. In various embodiments, component 150 receives one or more advertisements and priming objects. The one or more advertisements and the dictionary of priming objects may be created using a digital studio or any other object generation tools known and understood in the art.

In step 306, component 150 identifies an advertisement and placement context. In the depicted embodiment, component 150 identifies placement context for an identified advertisement in a predetermined area in a virtual world based on received advertisements, visual data from a user, identified contextual data, and/or the identified objects in the predetermined area, wherein predetermined area is a predetermined area in a virtual world/environment that is associated with the location and/or actions of a user in the virtual world/environment.

In step 308, component 150 associates the advertisement and placement context. In various embodiments, component 150 generates an association between the advertisement and placement context through a priming event, an object, and/or objective. In various embodiments, utilizing the data in remote database, component 150 associates the data with the semantic context and the priming object, priming event, and/or objective. In various embodiments, advertisement and semantic context labeling data is stored in a relational table that models a Key-Value-AD table such that association can be resolved quickly using Graph Traversals. The data associated with the advertisement and semantic context labeling may be based on real world sizes. The advertisement and semantic context labeling data may be utilized by component 150 to identify placement context.

In step 310, component 150 presents the priming event. In various embodiments, component 150 identifies a presentation window. Component 150 may evaluate and identify, for a user, the timing and position of a priming event or object in a presentation window. Component 150 may hook into the user's current location and conversation and analyzes and stores the images, snapshots of the video to help aid in determining a direction of the user, and objects in view and the intent of objects within a predetermined area. component 150 may select a timing and a position of a priming event 166 based on an identified presentation window. Component 150 may present the priming event 168 when the user is within the identified presentation window. Component 150 may present the priming event when the user is within the identified presentation window, the priming event, object or objective. Component 150 may generate and output the priming object to the identified presentation window using a hook or any other form of system integration known and understood in the art.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for enhancing advertising effectiveness in a virtual environment, the computer-implemented method comprising:
  - identifying placement context for an identified advertisement in a predetermined area within the virtual environment to be displayed in a user interface of a client computer based on received advertisements, visual data from a user, identified contextual data, and/or one or more identified objects in the predetermined area, wherein identifying the placement context comprises analyzing a virtual visual display of the user interface;
  - associating the identified advertisement and the placement context with a priming event or an object within the virtual environment based on the analysis of the virtual visual display of the user interface, wherein the object is virtual object within the virtual environment associated with the identified advertisement;
  - selecting, for the user in the virtual environment, a timing and position of the priming event or the object in a presentation window within the virtual visual display of the user interface;
  - generating and rendering, by the client computer through the user interface, the priming event or the object within the virtual environment when the user is within the presentation window;
  - modifying the virtual visual display within the user interface by dynamically adjusting the rendering of the object in the presentation window so that the rendered object fits within existing virtual objects within the virtual environment; and
  - applying a blurring feature or reducing processing power to fully render video and audio associated with the object to present streams outside of a subset.

2. The computer-implemented method of claim 1, further comprising:
  - selecting and outputting, through virtual environment software or hardware, product placement in a field of view of a user based on contexts and a correlating degree of focus on object data to provide multiple varying collections of data objects.

3. The computer-implemented method of claim 1, further comprising:
  - identifying the presentation window, wherein identifying the presentation window comprises:

identifying, for the user, the timing and position of a priming event or object in the predetermined area based on a location and actions of the user.

4. The computer-implemented method of claim 1, further comprising:

receiving and generating the identified advertisement; and labeling the identified advertisement and the object associated with predetermined semantic context data for the identified advertisement and contextual data associated with the identified advertisement and product and service being advertised, wherein the object is objects in a virtual environment that fit within the predetermined semantic context data for the identified advertisement.

5. The computer-implemented method of claim 4, wherein the predetermined semantic context data for the identified advertisement is based on real world physical dimensions.

6. The computer-implemented method of claim 4, further comprising:

storing the identified advertisement and the predetermined semantic context labeling data in a relational table such that association can be resolved quickly using graph traversals; and enhancing the table with geospatial relational tables to search and enrich one or more contextual relationships that are derived.

7. The computer-implemented method of claim 1, further comprising:

removing a presented priming object upon a transition of focus by the user to a generated advertisement; and limiting an amount of space and an amount of presented repetitions of the presented priming object based on predetermined paid revenue or predetermined value of the identified advertisement.

8. A computer system for enhancing advertising effectiveness in a virtual environment, the computer system comprising:

one or more computer processors;

one or more computer readable storage devices;

program instructions stored on the one or more computer readable storage devices for execution by at least one of the one or more computer processors, the stored program instructions comprising:

program instructions to identify placement context for an identified advertisement in a predetermined area within the virtual environment to be displayed in a user interface of a client computer based on received advertisements, visual data from a user, identified contextual data, and/or one or more identified objects in the predetermined area, wherein identifying the placement context comprises analyzing a virtual visual display of the user interface;

program instructions to associate the identified advertisement and the placement context with a priming event or an object within the virtual environment based on the analysis of the virtual visual display of the user interface, wherein the object is virtual object within the virtual environment associated with the identified advertisement;

program instructions to select, for the user in the virtual environment, a timing and position of the priming event or the object in a presentation window within the virtual visual display of the user interface;

program instructions to generate and render, by the client computer through the user interface, the priming event or the object within the virtual environment when the user is within the presentation window;

program instructions to modify the virtual visual display within the user interface by dynamically adjust the rendering of the object in the presentation window so that the rendered object fits within existing virtual objects within the virtual environment; and program instructions to apply a blurring feature or reducing processing power to fully render video and audio associated with the object to present streams outside of a subset.

9. The computer system of claim 8, further comprising:

program instructions to select and output, through virtual environment software or hardware, product placement in a field of view of a user based on contexts and a correlating degree of focus on object data to provide multiple varying collections of data objects.

10. The computer system of claim 8, further comprising:

program instructions to identify the presentation window, wherein identifying the presentation window comprises:

program instructions to identify, for the user, the timing and position of a priming event or object in the predetermined area based on a location and actions of the user.

11. The computer system of claim 8, further comprising:

program instructions to receive and generate the identified advertisement; and program instructions to label the identified advertisement and the object associated with predetermined semantic context data for the identified advertisement and contextual data associated with the identified advertisement and product and service being advertised, wherein the object is objects in a virtual environment that fit within the predetermined semantic context data for the identified advertisement.

12. The computer system of claim 11, wherein the predetermined semantic context data for the identified advertisement is based on real world physical dimensions.

13. The computer system of claim 11, further comprising:

program instructions to store the identified advertisement and the predetermined semantic context labeling data in a relational table such that association can be resolved quickly using graph traversals; and program instructions to enhance the table with geospatial relational tables to search and enrich one or more contextual relationships that are derived.

14. The computer system of claim 8, further comprising:

program instructions to remove a presented priming object upon a transition of focus by the user to generated identified advertisement; and program instructions to limit an amount of space and an amount of presented repetitions of the presented priming object based on predetermined paid revenue or predetermined value of the identified advertisement.

15. A computer program product for enhancing advertising effectiveness in a virtual environment, the computer program product comprising:

one or more computer readable storage devices and program instructions stored on the one or more computer readable storage devices, the stored program instructions comprising:

program instructions to identify placement context for an identified advertisement in a predetermined area within the virtual environment to be displayed in a user interface of a client computer based on received advertisements, visual data from a user, identified contextual data, and/or one or more identified objects in the predetermined area, wherein identifying the placement context comprises analyzing a virtual visual display of the user interface;

program instructions to associate the identified advertisement and the placement context with a priming event or an object within the virtual environment based on the analysis of the virtual visual display of the user interface, wherein the object is virtual object within the virtual environment associated with the identified advertisement;

program instructions to select, for the user in the virtual environment, a timing and position of the priming event or the object in a presentation window within the virtual visual display of the user interface;

program instructions to generate and render, by the client computer through the user interface, the priming event or the object within the virtual environment when the user is within the presentation window;

program instructions to modify the virtual visual display within the user interface by dynamically adjust the rendering of the object in the presentation window so that the rendered object fits within existing virtual objects within the virtual environment; and program instructions to apply a blurring feature or reducing processing power to fully render video and audio associated with the object to present streams outside of a subset.

16. The computer program product of claim 15, further comprising:

program instructions to select and output, through virtual environment software or hardware, product placement in a field of view of a user based on contexts and a correlating degree of focus on object data to provide multiple varying collections of data objects.

17. The computer program product of claim 15, further comprising:

program instructions to identify the presentation window, wherein identifying the presentation window comprises:

program instructions to identify, for the user, the timing and position of a priming event or object in the predetermined area based on a location and actions of the user.

18. The computer program product of claim 15, further comprising:

program instructions to receive and generate the identified advertisement; and program instructions to label the identified advertisement and the object associated with predetermined semantic context data for the identified advertisement and contextual data associated with the identified advertisement and product and service being advertised, wherein the object is objects in a virtual environment that fit within the predetermined semantic context data for the identified advertisement, and wherein the predetermined semantic context data for the identified advertisement is based on real world physical dimensions.

19. The computer program product of claim 18, further comprising:

program instructions to store the identified advertisement and the predetermined semantic context labeling data in a relational table such that association can be resolved quickly using graph traversals; and program instructions to enhance the table with geospatial relational tables to search and enrich one or more contextual relationships that are derived.

20. The computer program product of claim 15, further comprising:

program instructions to remove a presented priming object upon a transition of focus by the user to generated identified advertisement; and program instructions to limit an amount of space and an amount of presented repetitions of the presented priming object based on predetermined paid revenue or predetermined value of the identified advertisement.

* * * * *